(12) United States Patent
Destain

(10) Patent No.: US 8,662,675 B2
(45) Date of Patent: Mar. 4, 2014

(54) COMPACT IMAGE OFFSET PROJECTION LENS

(75) Inventor: Patrick Rene Destain, Allen, TX (US)

(73) Assignee: Texas Instruments Incorporated, Dallas, TX (US)

(*) Notice: Subject to any disclaimer, the term of this patent is extended or adjusted under 35 U.S.C. 154(b) by 214 days.

(21) Appl. No.: 13/176,863

(22) Filed: Jul. 6, 2011

(65) Prior Publication Data

US 2012/0008102 A1   Jan. 12, 2012

Related U.S. Application Data

(60) Provisional application No. 61/363,177, filed on Jul. 9, 2010.

(51) Int. Cl.
- *G03B 21/14* (2006.01)
- *G02B 15/14* (2006.01)
- *G02F 1/1335* (2006.01)

(52) U.S. Cl.
USPC ............ 353/69; 353/70; 353/100; 359/637; 359/691; 349/5; 349/57

(58) Field of Classification Search
USPC ............ 353/69, 70, 100; 359/555, 637, 691; 349/5, 57
See application file for complete search history.

(56) References Cited

U.S. PATENT DOCUMENTS

| | | | | |
|---|---|---|---|---|
| 5,442,413 A * | 8/1995 | Tejima et al. | .......... | 353/69 |
| 5,820,240 A * | 10/1998 | Ohzawa | .......... | 353/70 |
| 6,076,931 A | 6/2000 | Bone | | |
| 6,450,648 B1 * | 9/2002 | Ohzawa et al. | .......... | 353/70 |
| 7,145,728 B2 * | 12/2006 | Cha | .......... | 359/637 |

FOREIGN PATENT DOCUMENTS

| | | |
|---|---|---|
| JP | 2000-321527 | 11/2000 |
| JP | 2002-006398 | 1/2002 |
| KR | 102003-0018740 | 3/2003 |

* cited by examiner

*Primary Examiner* — Tony Ko
*Assistant Examiner* — Magda Cruz
(74) *Attorney, Agent, or Firm* — Warren L. Franz; Wade J. Brady, III; Frederick J. Telecky, Jr.

(57) ABSTRACT

A projection lens for projecting images with high degrees of image offset while limiting the physical offset of the projection lens elements. The projection lens arrangement limits the displacement of the optical elements relative to the optical axis of the display panel and enables a very thin, efficient projector.

10 Claims, 10 Drawing Sheets

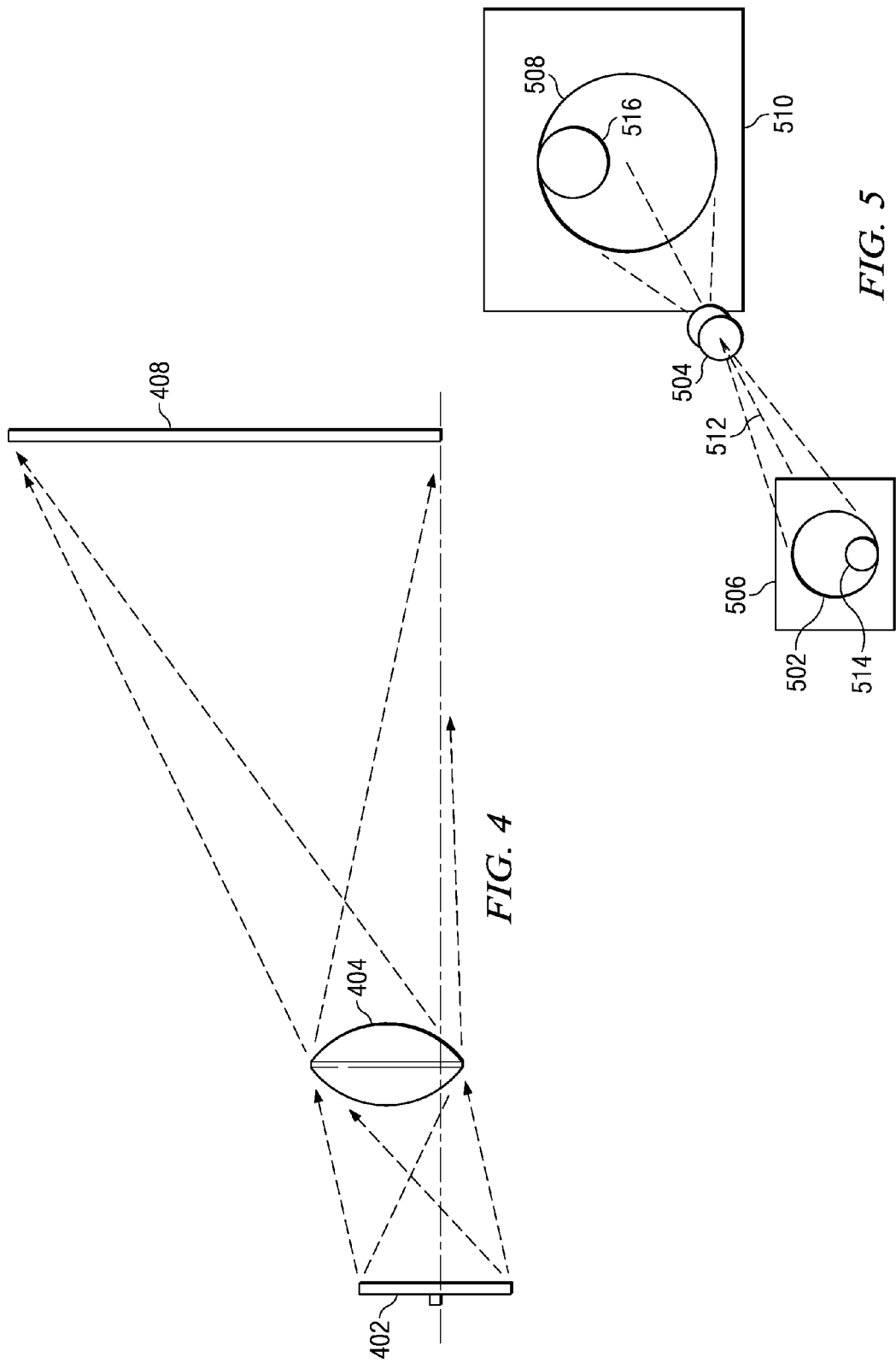

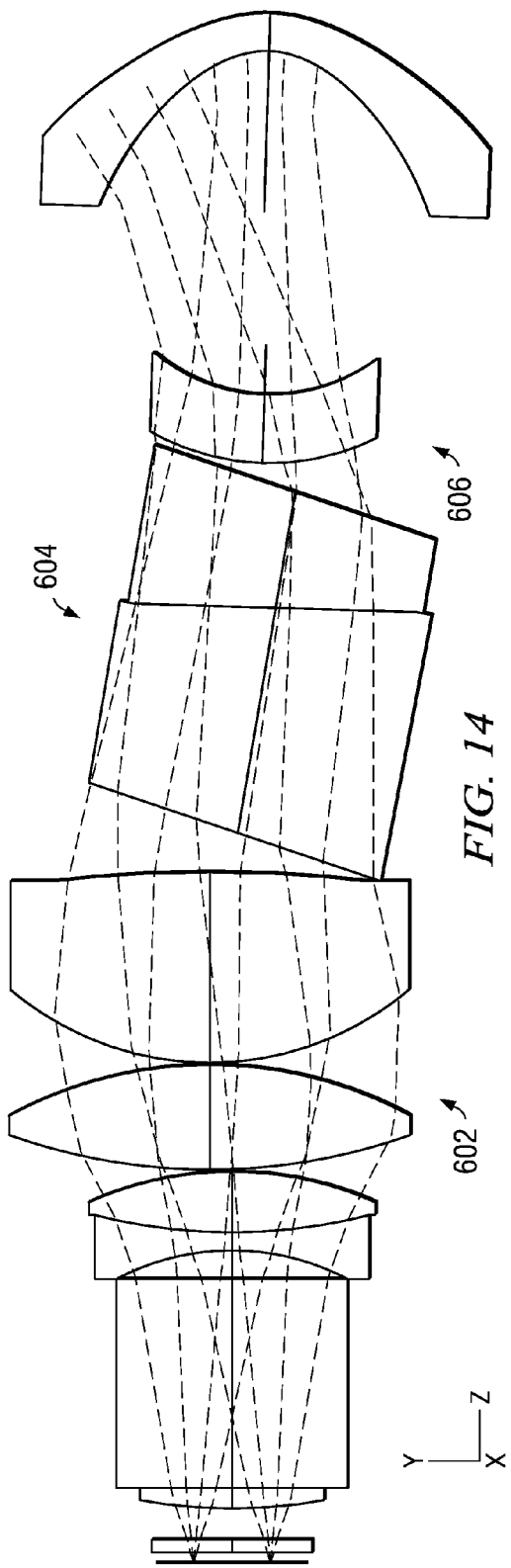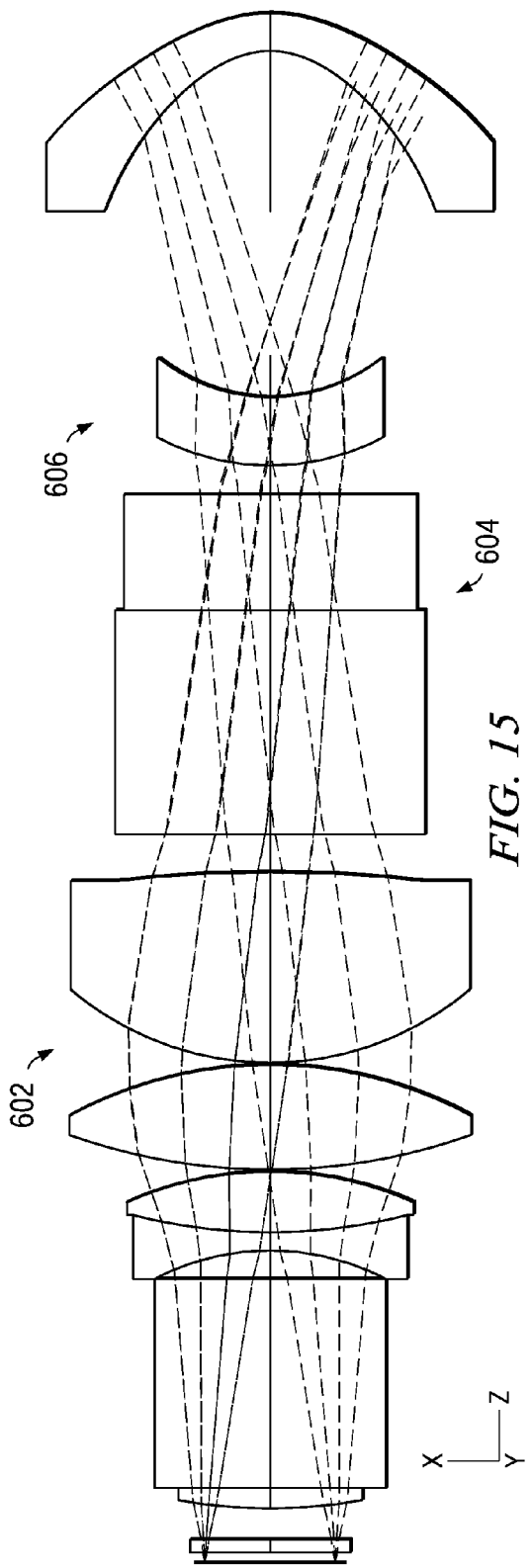

COMPACT IMAGE OFFSET PROJECTION LENS

FIELD OF THE INVENTION

This invention relates to the field of projection display systems. More particularly, this invention relates to projection optics used by projection display systems.

BACKGROUND OF THE INVENTION

Display systems generally may be grouped into direct view displays and projection displays. Direct view displays allow direct observation of the object plane by the user of the direct view display system. Projection display systems project light from an object plane onto an image plane such that the user of the projection display system views light from the image plane. The image plane of a projection display system may be a front projection surface, in which the display system and the viewer are located on the same side of the image plane, or a rear projection surface, in which the display system and the viewer are located on opposite sides of the image plane. Unless otherwise stated, the concepts taught herein apply to both front and rear projection display systems.

Projection display systems rely on light from the object plane. This light may be emitted from a display panel located at the object plane, for example by a plasma discharge panel, an array of light emitting diodes, or the phosphor screen of a cathode ray tube, or any other source of light. Alternatively, the light may be transmitted or reflected by a display panel located at the object plane, for example by a micromirror array, a transmissive liquid crystal device, a reflective liquid crystal device, a photographic slide, or any physical object capable of reflecting incident light.

Modern display systems have made tremendous advances over the last ten to twenty years in terms of color fidelity, image brightness, image contrast, image distortion, and image size. Consumer expectations for display systems continue to increase. As such, it is very desirable to produce very high quality images from very small, low-cost display systems that are easy to use and adapt well to typical viewing environments.

SUMMARY OF THE INVENTION

Objects and advantages will be obvious, and will in part appear hereinafter and will be accomplished by the present invention which provides a method and system for creating images having a high image offset while maintaining a small form factor, a short throw, or both a small form factor and a short throw.

One embodiment of the present invention provides a projection lens comprising a display panel having an optical axis, a first lens group introducing image offset in a first direction relative to the optical axis, and an optical shifter shifting the optical path in a direction opposite the image offset.

Another embodiment of the present invention provides a projection lens comprising a display panel having an optical axis, a first lens group substantially collimating light from the display panel and introducing image offset in a first direction relative to the optical axis, and a second lens group focusing an image of the display panel on an image plane, wherein elements in the first lens group are offset relative to each other.

Another embodiment of the present invention provides a projection lens comprising a display panel having an optical axis, a first lens group substantially collimating light from the display panel and introducing image offset in a first direction relative to the optical axis, and a second lens group focusing an image of the display panel on an image plane, wherein elements in the first lens group are offset relative to each the optical axis by no more than 20% of a height of the display panel while the image has an image offset of 100% or more.

DESCRIPTION OF THE VIEWS OF THE DRAWING

For a more complete understanding of the present invention, and the advantages thereof, reference is now made to the following descriptions taken in conjunction with the accompanying drawings, in which:

FIG. 4 is a schematic view of a projection display system illustrating image offset.

FIG. 5 is a schematic view of a projection display system illustrating image offset.

FIG. 14 is a schematic view of a projection lens through the XZ plane according to one embodiment of the present invention.

FIG. 15 is a schematic view of the projection lens of FIG. 14 through the XY plane.

DETAILED DESCRIPTION

Figure 1:
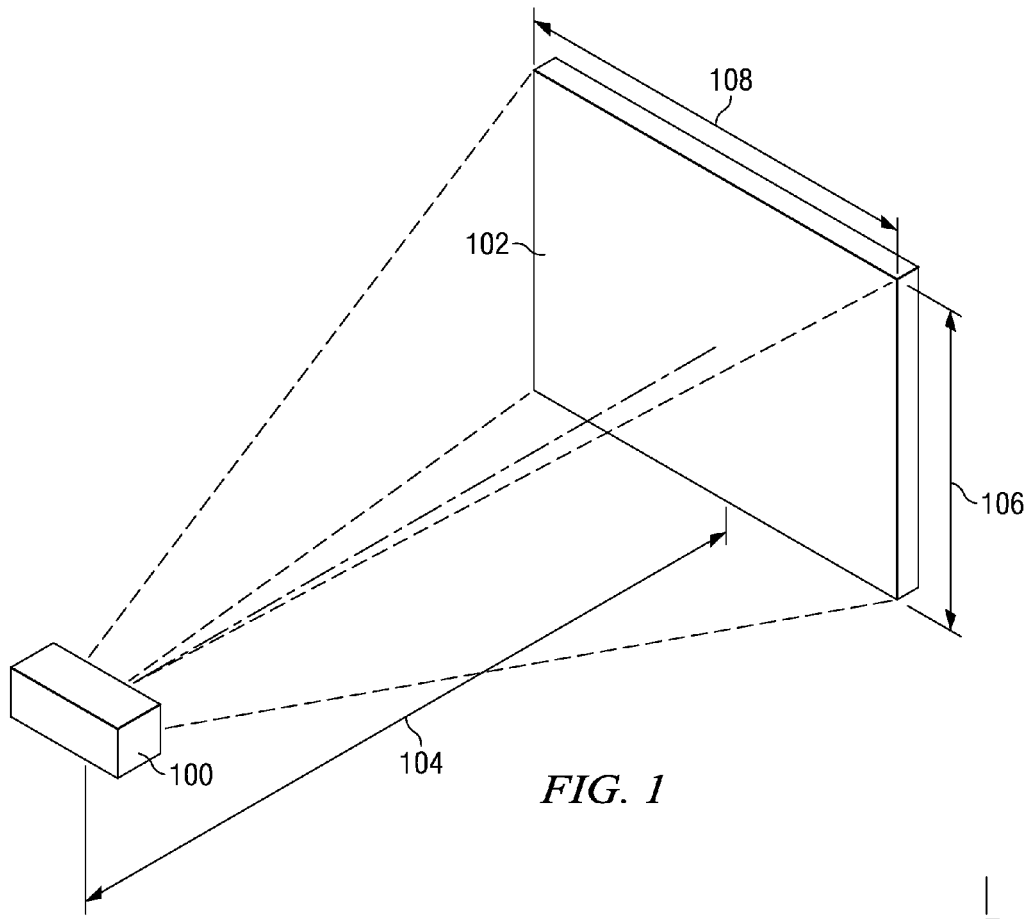
FIG. 1 is a schematic view of a projection display system illustrating the throw ratio of the projector.

FIG. 1 illustrates a projection display system 100 projecting an image onto an image plane 102. The projector 100 is positioned at a distance 104 from the image plane 102 and, at that distance, projects an image having a height 106 and a width 108. The distance 104 from the image plane 102, or screen, typically is called the projector throw. The ratio of the throw distance over the image width 108 typically is called the throw ratio.

Certain applications, such as move theaters, require a long throw in order to place the projector behind the audience where it will not be a distraction to the audience. In applications such as conference rooms, however, it is often desired to have a very short. Short throw projectors are desired in order to allow the creation of a large image in a small room. Short throw projectors also allow the projector to be positioned closer to the image plane. Positioning the projector close to the image plane in some situations has the advantage of limiting the area in which a person or object can interfere with the projection of the image onto the image plane.

Figure 2:
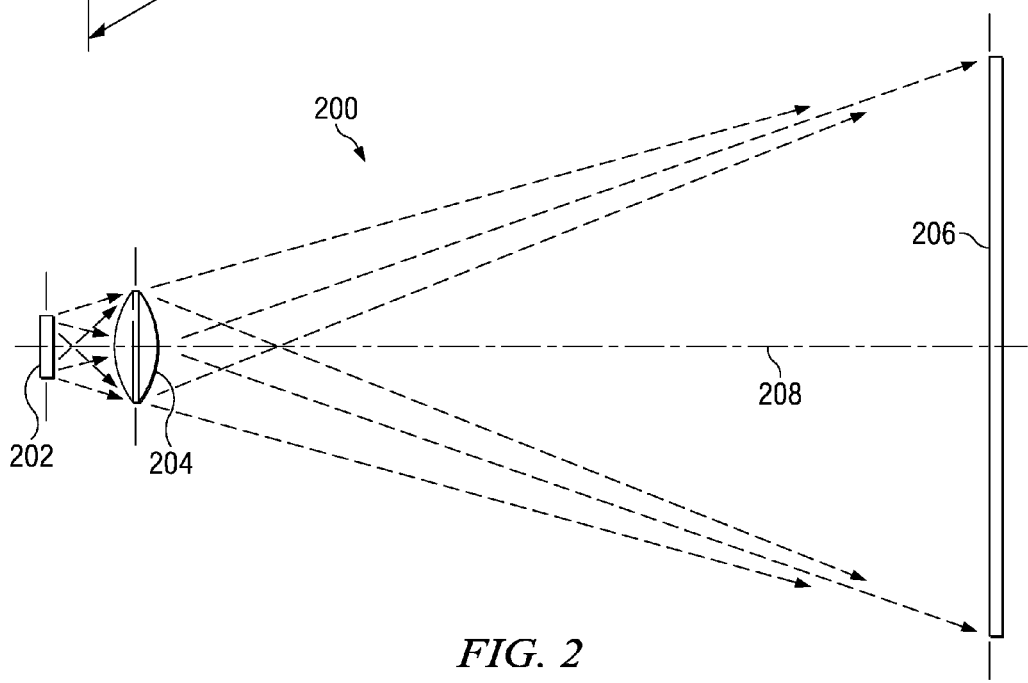
FIG. 2 is a schematic view of a typical projection display system illustrating a relationship between the display panel, projection lens, and display screen.

FIG. 2 is simplified schematic view of a typical projection display system 200 illustrating a relationship between the display panel, projection lens, and display screen. In FIG. 2, the planes in which the display panel 202, projection lens 204, and display screen 206 are located are all arranged to be perpendicular to a common optical axis 208.

In the display system 200 shown in FIG. 2, the optical axis 208 passes through the center of the display panel 202 and the display screen 206. Because the three components shown in FIG. 2 are centered on the optical axis 208—that is the three components are not offset from the optical axis—the system shown in FIG. 2 is considered to have no offset.

While projection lens 204 is shown as a single positive lens, it should be understood that this illustration is purely for convenience and is not intended to be an actual representation of a projection lens. Unless otherwise indicated expressly or by context, the terms lens and projection lens are used generically to indicate a single lens or a lens system comprised of optical elements. Likewise, illustrations of lenses and lens systems as a single lens, a group of lenses, or as a block are not intended to be limiting, and unless indicated expressly or by the context include single lenses, groups of lenses, and lenses in combination with additional optical elements.

Figure 3A:
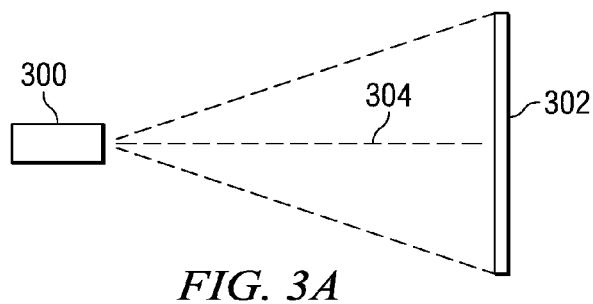
FIGS. 3A through 3C are schematic views projection display systems illustrating various amounts of image offset.

FIG. 3A is a schematic side view of a projector 300 and screen 302 illustrating zero offset configuration. While the optical architecture of the projector 300 is relatively simple and efficient, the use of such a projector can be challenging in many applications. For example, if the projector 300 is mounted against the ceiling of a room, nearly all of the top half of the projected image would be blocked by the ceiling. Projectors with zero offset that are mounted to the ceiling of a room are often mounted on an extension to hold the projector away from the ceiling. The long extension necessary to space the projector away from the ceiling is not only unsightly and sometimes unstable, it moves the projector into the field of view of many of the people in the room and therefore is distracting.

An alternative to a long extension mount is to mount the projector at an angle relative to the ceiling to prevent the image from striking the ceiling. When the projection screen is mounted parallel to a wall of the room, mounting the projector to have an optical axis angled down toward the wall results in the projected image having significant keystoning—in which the bottom edge of the image is wider than the top edge of the image and the two sides of the image are not parallel with either other or perpendicular to either the top or bottom edges.

Likewise, a portable projector with zero offset is difficult to use. Portable projectors typically are placed on a tabletop surface. With zero offset, nearly half the projected image impinges on the table or, if the projector is placed to project over an edge of the table, nearly half of the image is projected onto the screen at a level below the tabletop wherein it is difficult for people sitting around the table to see. Alternatively, the portable projector is angled upwards to project the image away from the table, but as was the case with a projector angled down toward a screen, angling the projector upwards creates an undesirable keystone effect.

Figure 3B:
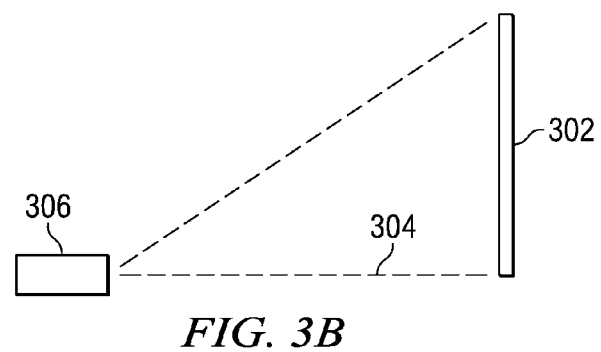

To overcome the foregoing problems, many projectors are designed to offset the projected image. FIG. 3B is a schematic side view of a projection system 306 which is designed to offset the image projected onto the screen 302 to one side of the optical axis 304. The projector shown in FIG. 3B is considered to have 100% image offset because the image projected onto the screen 302 is entirely on one side of the optical axis 304.

There are multiple methods of calculating the image offset. For the purposes of this disclosure and assuming the image is offset vertically above the optical axis, the image offset will be considered to be the distance from the optical axis to the center of the image divided by half the height of the image.

While the image offset typically is calculated by defining the optical axis as the optical axis of the projection lens, for reasons that will become apparent the optical axis will be defined herein as being the axis perpendicular to the display panel and passing through the center of the display panel.

Figure 3C:
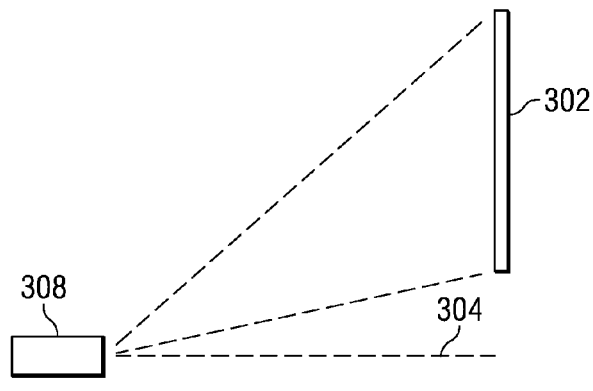

FIG. 3C is a schematic side view of a projection system 306 which is designed to offset the image projected onto the screen 302 to one side of the optical axis 304. The projector 308 shown in FIG. 3C is considered to have 150% image offset because the image projected onto the screen 302 is entirely one side of the optical axis 304 and separated from the optical axis by a distance equal to 25% of the image size in the direction in which the image is offset—in this case vertically in FIG. 3C. As a result, the offset distance, that is the distance from the optical axis to the center of the image, is 150% of the height of the image divided by two.

As illustrated in FIG. 4, image offset typically is implemented by shifting the display panel 402 relative to the projection lens 404. The shift of the display panel 402 relative to the projection lens 404, more particularly perpendicular to the optical axis 406 of the projection lens 404, results in a proportional, opposite shift of the image of the display system on the image plane or display screen 408.

Shifting the display panel 402 relative to the projection lens 404 in order to achieve desirable image offset, however, is not without significant costs. FIG. 5 illustrates the field of view 502 of a projection lens 504 on an object plane 506, and a corresponding field of view 508 on an image plane 510. As shown in FIG. 5, the object field of view 502 and the image field of view 508 are both shown centered about the optical axis 512 of the projection lens 504. The field of view of a lens often is referred to as the angular sweep of rays entering the lens that are focused onto the image plane. For the purposes of illustration the field of view is illustrated as the area on the object plane from which rays may enter the pupil of the lens.

If the lens design is held constant, shifting the optical axis of the object relative to the optical axis of the projection lens 504 requires the object being imaged to be smaller than it could be if the optical axes of the object and the projection lens were aligned. This is illustrated by the circle 514 shown within the lens field of view 502 on the object plane 506.

If the size of the object being imaged is held constant, the size of the lens must be increased, or the focal length of the projection lens must be increased. Both of these alternatives have undesirable effects. Increasing the size of the lens increases not only the form factor of the projector, it also increases the weight and the cost of the projector.

A well corrected projection lens generally has a focal length that is approximately two times the diameter of the portion of the object plane being imaged in a zero offset projector. Increasing the focal length of the projection lens results in a corresponding increase in the throw of the projection lens, which makes it more difficult to use a projector in many environments.

Even traditional projectors benefit from the invention disclosed herein. Utilizing the invention taught herein allows a traditional projector to use a smaller, lower-cost projection lens without having to increase the throw of the projection system.

A substantial portion of the projection lens in a 100% offset display system is not used to produce the image of the display panel. As a result, elements of the projection lens may be trimmed to reduce the materials required to produce the lens as well as to reduce the size and weight of the projection lens.

Achieving a large image offset is very important to consumer acceptance of a projector product. As a result, projector manufacturers either pass on the additional cost of the larger optics or compromise the lens design in other ways to keep the cost of the lens in balance. For example, a slower lens may be used to reduce the size and cost of the lens. A slower lens, however, reduces the image brightness. Another way to limit the cost and weight impact of the larger lens system is to substitute plastic lens elements for some glass lens elements, but this alternative may reduce the image quality of the lens.

Recently, a new class of image projectors has been introduced. These projectors are often called "pico-projectors" because of their very small size. One of the major goals for the designers of pico-projectors is to integrate the projector in a cell phone, or in a cell phone sized package. This size restriction makes it difficult to design a pico-projector with 100% image offset for at least two reasons.

First, the form factor of the pico-projector means that the lens cannot simply be shifted relative to the display panel as any shift in the lens relative to the display panel requires the thickness of the projector to be increased. The size of the display panel cannot be reduced without a loss in brightness efficiency. Similarly, a slower lens cannot be used without a loss in brightness efficiency.

For the purposes of this disclosure, unless otherwise stated, the thickness of the projector will be considered to be in the direction perpendicular to the optical axis of the projection path in the direction of the optical offset. Generally the projector thickness is aligned with the shorter of the two orthogonal dimensions of the display panel as the image of the display panel is aligned to be wider than it is high by the aspect ratio, typically 16:9 or 4:3, of the display panel.

Since the form factor of the pico-projector must be kept as thin as practical—currently around 7 mm or less, it is very important to achieve the desired image offset without using an offset lens that increases the thickness of the display.

Likewise, a cell phone or similarly sized projector has limited power available from the device's battery. The limited power already presents very demanding efficiency requirements in order to produce a suitably bright image, and generally it is unacceptable to utilize inefficient, slower optics, which would reduce either the brightness of the display or require the use of a brighter illumination source and the corresponding decrease in the battery-based operation time of the display in order to achieve the desired image offset without using larger optics.

The present invention provides several novel methods of and systems for creating a large image offset without a corresponding large physical offset between the display panel and the projection lens. These methods and systems include shifting the optical ray bundle in a direction opposite the image offset in order to achieve the effect of offsetting the lens without the impact on the thickness of the display system, decentering some of the lens elements relative to other lens elements, and tilting some of the lens elements—generally about the aperture of the projection lens. These methods are used individually or in combination to achieve a substantial image offset without a correspondingly substantial offset of the projection lens and the accompanying substantial increase in the size of the projection lens.

Figure 6:
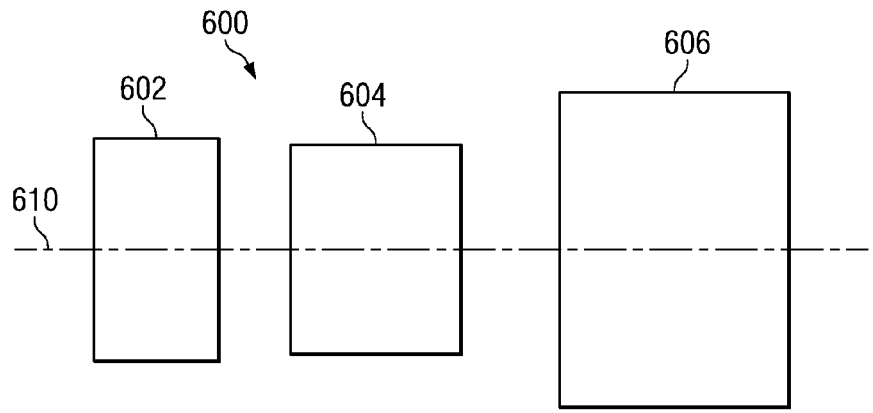
FIG. 6 is a block schematic views of a projection lens illustrating three groups of optical elements.

FIG. 6 is a schematic side view of the lens system 600. In FIG. 6, the optical axis 610 extends in the x-direction from the object plane to the image plane. The other dimension shown in FIG. 6 is considered the z-direction. The z-direction typically is oriented in the projectors to extend from the base of the projector through the top of the projector and is considered to extend in the positive direction toward the top of FIG. 6. Thus, the direction of desired image offset, whether the projector is mounted upside down to a ceiling or set on a table top, is assumed to be in the positive z-direction toward the top of FIG. 6.

The projection lens 600 shown in FIG. 6 comprises three groups of optical elements. A first group 602 is located closest to the object plane of the lens and is often called a rear group when describing a projection lens. A second group 604 is located next to the first group 602. A third group 606 which is located closest to the image plane of the lens and is often call a front group when describing a projection lens. Each of the groups is comprised of one or more optical elements.

According to one embodiment, the first group 602 of optical elements cooperates to collect rays of light originating in the field of view of the lens on the object plane and focuses the collected rays into a substantially collimated bundle of light rays. The bundle of light rays from the first group typically is collected such that the marginal rays are substantially collimated.

Substantially collimated in this case means the marginal rays leaving the first group are within 10 degrees of parallel. More particularly, the marginal and chief rays are within 4 degrees of parallel, within 2 degrees of parallel, or within 1 degree of parallel.

According to one embodiment of the present invention, at least one of the optical lens elements in the first lens group is decentered such that it creates image offset in the desired offset direction. The decentered lens typically is not the optical lens element closest to the display panel. Keeping one or more of the lens elements closest to the display panel centered on the optical axis of the display panel helps to minimize the thickness of the projector.

Figure 7:
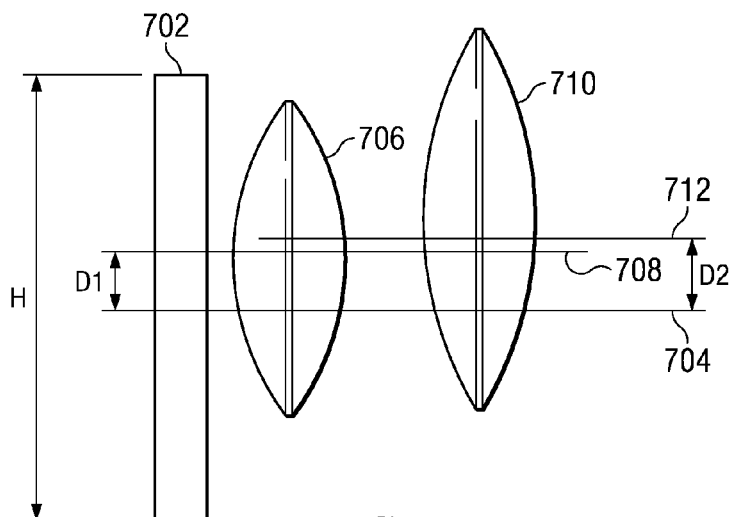
FIG. 7 is a schematic view of a projection lens illustrating offset relative to display panel.

FIG. 7 is a schematic view of a two lens elements from a first group of lenses located near a display panel. In FIG. 7, the display panel 702 has a height "H" and is centered on the optical axis 704 of the display panel 702. A first lens 706 is positioned such that an optical axis 708 of the first lens 706 is decentered, or offset, a distance "D1" from the optical axis 704 of the display panel 702. Likewise, a second lens element 710 having an optical axis 712 is decentered a distance "D2" from the optical axis 704 of the display panel 702.

The lens shown in FIG. 7 is designed achieve image offset without decentering the lenses enough to substantially increase the thickness or height of the projector. An image offset of 100% can be achieved without decentering the lenses of the first group more than 20% of the height of the display panel. Preferably, 100% image offset is achieved by decentering the lenses in the first group no more than 15% of the height of the display panel. More preferably, 100% image offset is achieved by decentering the lenses in the first group no more than 10% of the height of the display panel.

Decentering a lens element in the first group so that the optical axis of the decentered lens element is offset from the optical axis of the display panel results in a shift in the bundle of rays forming the image. In other words, the volume internal to the projection lens that is used by the optical path of the rays that will form the projected image is shifted in the positive z direction. At large image offsets, this shift in the bundle of rays forming the image requires a large projection lens and increases the height of the lens—and therefore the projector—to unacceptable levels.

One novel method of preventing the height of the projection lens from growing to unacceptable levels is to shift the optical path, or ray bundle, in the negative z direction. This shift in the optical path may be thought of as a boresight correction because it brings the bundle of rays back toward the center of the lens bore, or even past the center of the lens bore.

According to one embodiment of the present invention, the optical elements used to shift the ray bundle in the negative z direction ideally do not have any other effect on the ray bundle. In practice, however, because the index of refraction of the optical elements that shift the ray bundle is not unity, the optical elements will change the effective path length of the lens.

The optical shifter should not be confused with prior art methods of folding the projection lens. When the lens is folded, the direction of travel relative to the optical axis of the lens is changed substantially. According to the present invention, the axis of the ray bundle is changed less than 15 degrees, more particularly less than 10 degrees, more particularly less than 5 degrees, and more particularly less than 1 degree. Typically, a folded lens results in the object plane and the image plane having a non-parallel relationship, while shifting the optical path typically results in the object plane and the image plane maintaining a parallel relationship.

Figure 8:
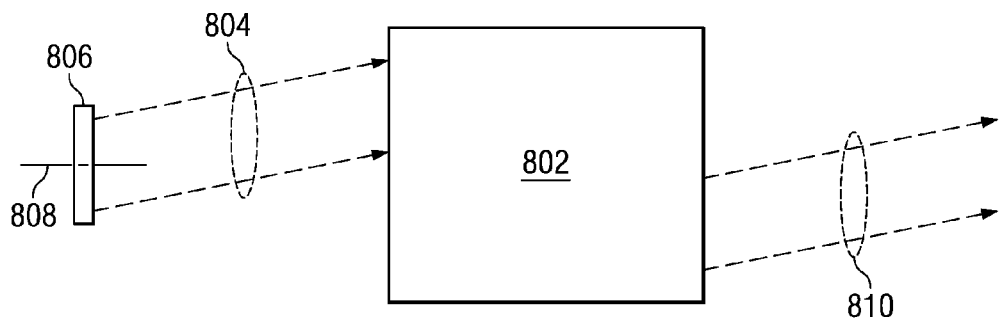
FIG. 8 is a schematic view of an optical shifter according to one embodiment of the present invention.

FIG. 8 is a schematic illustration of one embodiment of an optical shifter 802 according to one embodiment of the present invention. In FIG. 8, a ray bundle 804 from a display panel 806 is incident on the optical shifter 802. The incident ray bundle 804 is shown as collimated rays and is at an angle relative to on optical axis 808 of the display panel 806 due to a decentered first group of lenses, not shown, which are used to create image offset as described above. As the ray bundle 804 diverges from the optical axis 806, the position of a third group of optical elements, not shown, must be moved in the positive z-direction in order to be positioned on the optical path of the ray bundle 804.

Optical shifter 802 shifts the optical path of the ray bundle 804 in the negative z-direction. According to the embodiment shown in FIG. 8, the optical shifter does not focus or defocus the rays, but merely shifts the rays in the negative z-direction. This allows a third group of optical elements to be positioned along the path of ray bundle 810, which is closer to the optical axis 808. Positioning the third group of elements closer to the optical axis 806 of the display panel 806 allows the lens elements used in the projection lens to be positioned closer to the position they would have in a non-offset lens while still providing substantial offset. In this manner, the projection lens enables a thinner projector while still providing 100% image offset relative to the optical axis 808 of the display panel 806.

Figure 9:
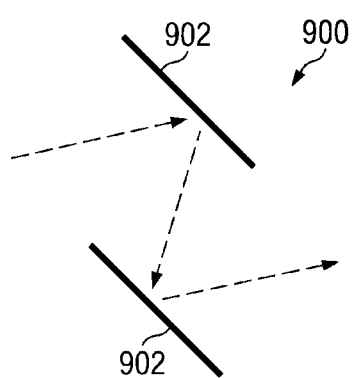
FIG. 9 is a schematic view of an optical shifter according to one embodiment of the present invention.

FIG. 9 is a schematic view of an optical shifter according to one embodiment of the present invention. Optical shifter 900 is comprised of two flat mirrors 902, each of which folds the optical path. Each of the flat mirrors 902 in FIG. 9 folds the optical path and the two flat mirrors cooperatively shift the optical path without altering the angle of the optical path.

Placing the flat mirrors horizontally would shift the optical path, but would result in a very long projection lens in the horizontal direction. Tilting the mirrors away from the horizontal direction shortens the projection lens, but increases the height of the projection lens that is required to avoid blocking the optical path with the flat mirrors. In some cases, the height of the optical shifter 900 is approximately twice the height of the optical bundle, which limits the benefits achieved by using the optical shifter 900.

Figure 10:
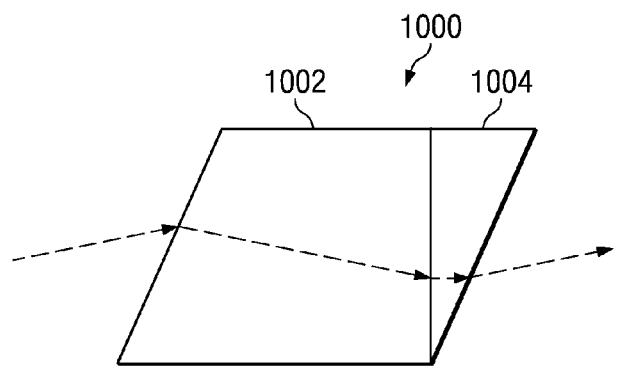
FIG. 10 is a schematic view of an optical shifter according to one embodiment of the present invention.

FIG. 10 is a schematic view of another optical shifter 1000 according to another embodiment of the present invention. In FIG. 10, a pair of prisms are used to refract and shift the light bundle. The prisms may be achromatized for color correction, but rarely are apochromatic. The prisms typically introduce keystone to the image, but as will be discussed below, the keystone can be used to offset keystone created by other portions of the lens.

Figure 11:
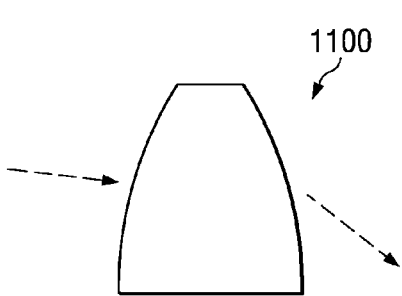
FIG. 11 is a schematic view of an optical shifter according to one embodiment of the present invention.

FIG. 11 is a schematic view of another optical shifter 1100 according to another embodiment of the present invention. In FIG. 11, a decentered lens refracts the light in the negative z-direction. One or more decentered lenses may be used to shift the optical path of the image-bearing beam of light.

Figure 12:
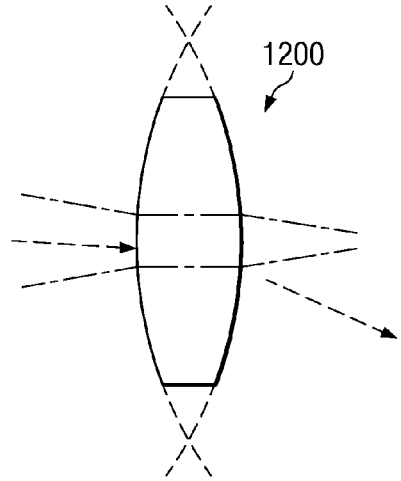
FIG. 12 is a schematic view of an optical shifter according to one embodiment of the present invention.

FIG. 12 is a schematic view of another optical shifter 1200 according to yet another embodiment of the present invention. In FIG. 12, a wedged lens, that is a lens whose first and second surfaces are decentered relative to each other, is used to refract the light in the negative z-direction. One or more wedged lenses may be used to shift the optical path of the image-bearing beam of light.

Placing an optical shifter in the projection lens shifts the image path in the negative z-direction which reduces the height of the projection lens for a given image offset. The optical shifter should provide a linear shift of the optical path in the negative z-direction without a corresponding angular change in the optical that in a direction that would reduce the offset. This allows the position of the lens in the z-direction to be maintained relative to the ray bundle, while shifting the physical location and alignment of the lenses to minimize the impact of the shifted lenses on the height of the projector.

The image artifacts introduced by the optical shifter may be used to counteract image artifacts introduced by other elements of the projection lens. For example, the keystone artifact introduced by a wedge may be used to counteract keystone artifacts introduced by tilting lenses and tilted image planes. Additionally, as shown in FIG. 13, chromatic aberrations introduced by the optical shifter may counteract chromatic aberrations introduced by the optical shifter.

Figure 13:
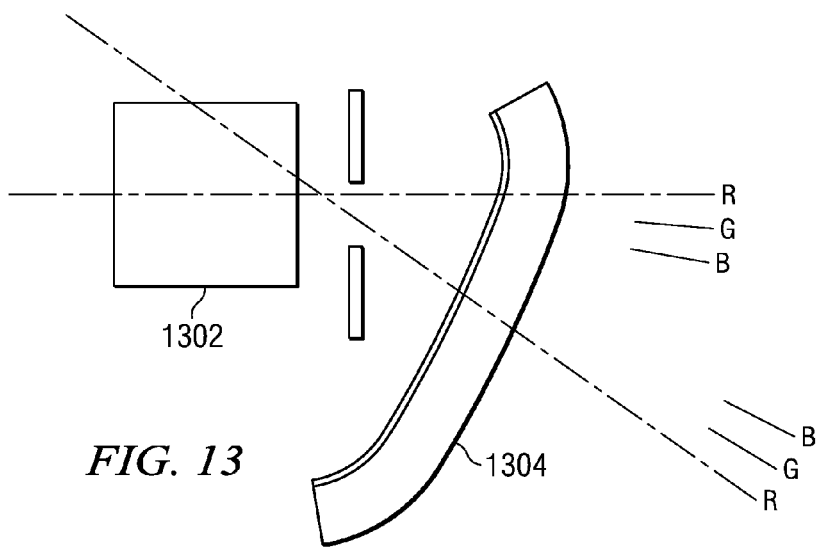
FIG. 13 is a schematic view of a portion of a projection lens illustrating a tilted lens group according to one embodiment of the present invention.

In FIG. 13, an optical shifter 1302 is shown along with a tilted lens 1304. The tilted lens 1304 is used to introduce additional offset in the optical path and is located in the third group of optical elements described above. The entire third group may be tilted to compensate for various chromatic artifacts. The third group is rotated about the aperture stop of the lens. Rotating the third group about the aperture of the lens has the effect of adding wedge to the optical path.

The tilted third optical group introduces a chromatic aberration by refracting the blue light less than the red light. As a result, the blue light is refracted in the positive z-direction relative to the red light as shown in FIG. 13. The optical shifter has the opposite effect. The optical shifter may refract the blue light in a negative z-direction relative to the red light as shown in FIG. 13. Having two elements with opposite effects on the light in the projection path allows the lens designed to use one effect to offset or cancel out the other effect.

The foregoing techniques may be used in various combinations to provide a high degree of image offset without a substantial increase in the thickness of the projection lens, the height of the projector, or an increase in the throw ratio of the projection lens.

Figure 16:
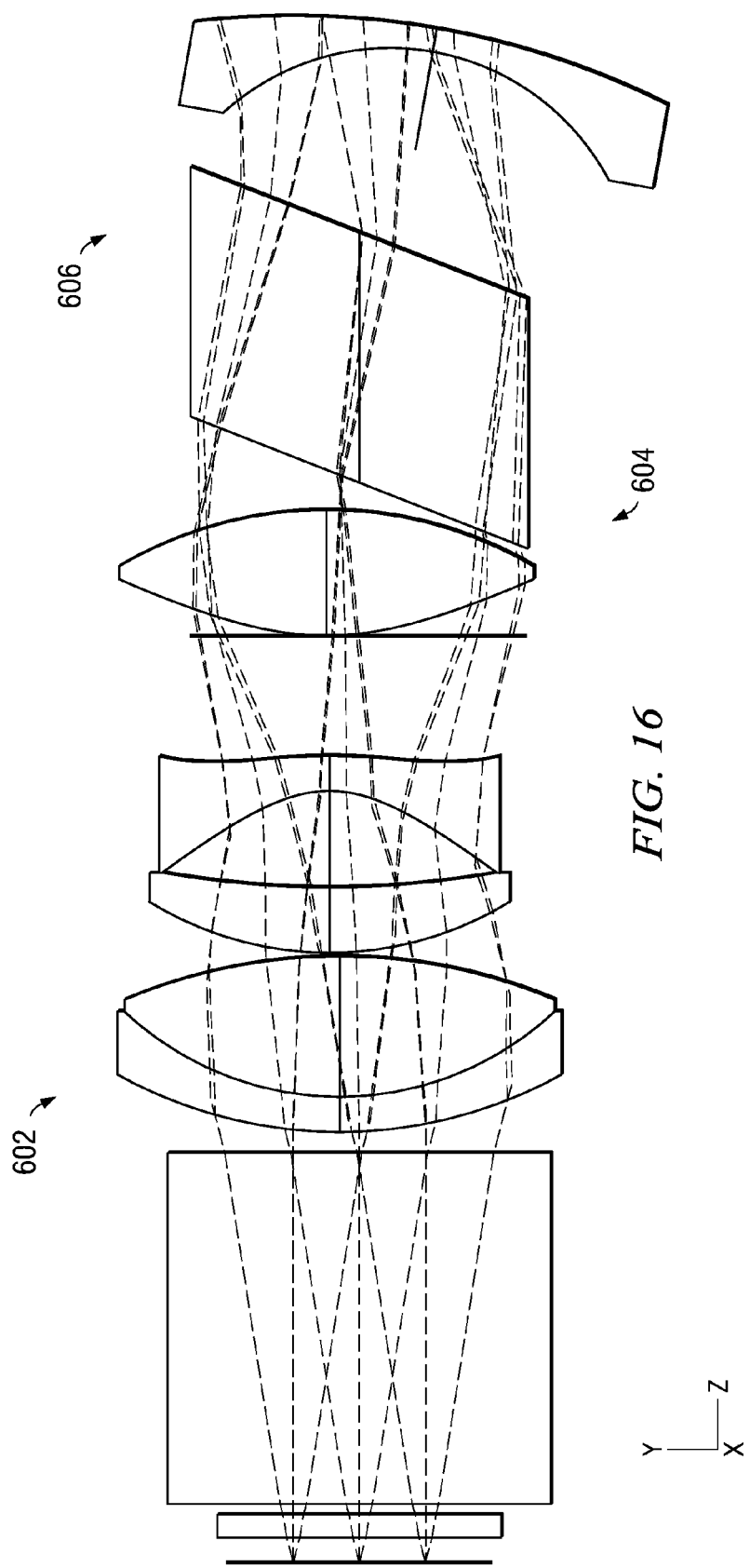
FIG. 16 is a schematic view of a projection lens through the XZ plane according to one embodiment of the present invention.
Figure 17:
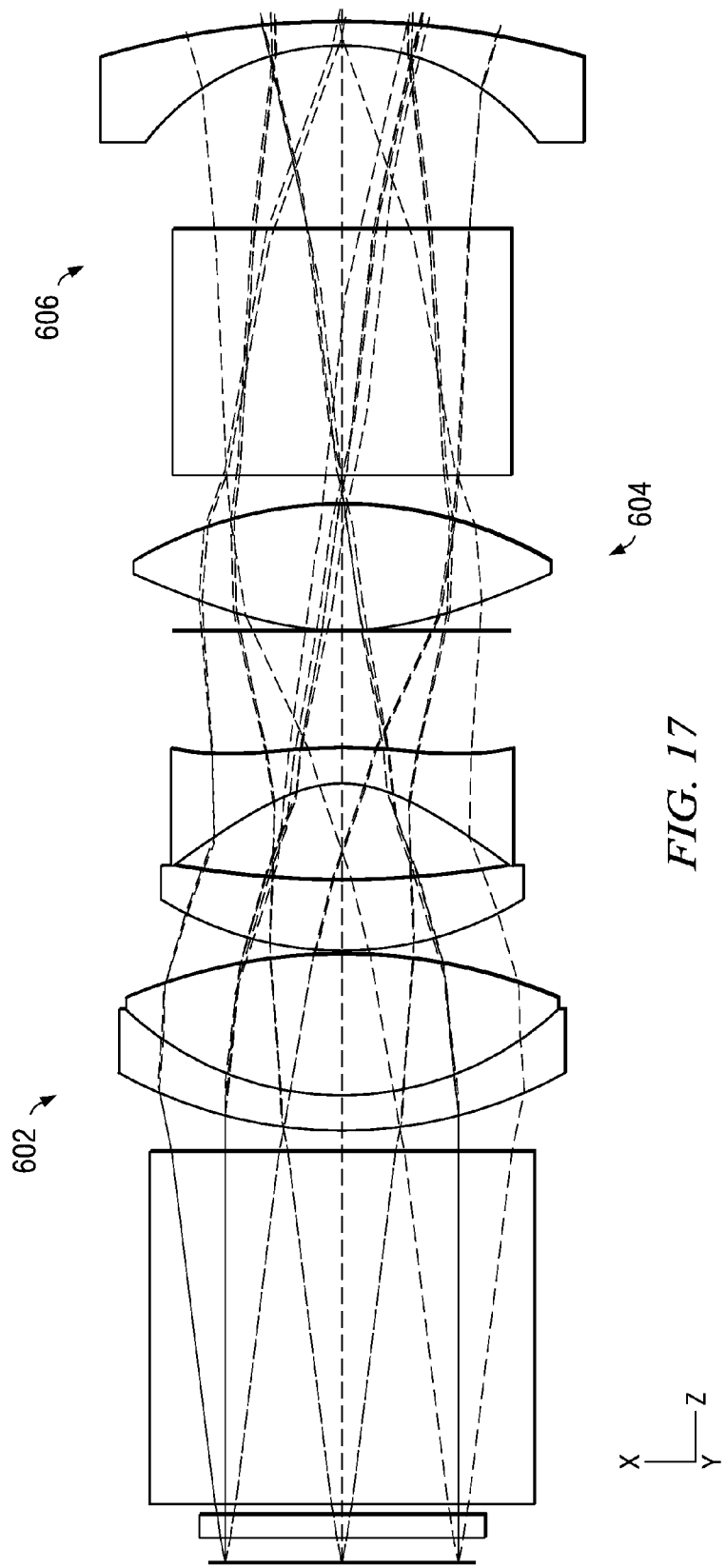
FIG. 17 is a schematic view of the projection lens of FIG. 16 through the XY plane.
Figure 18:
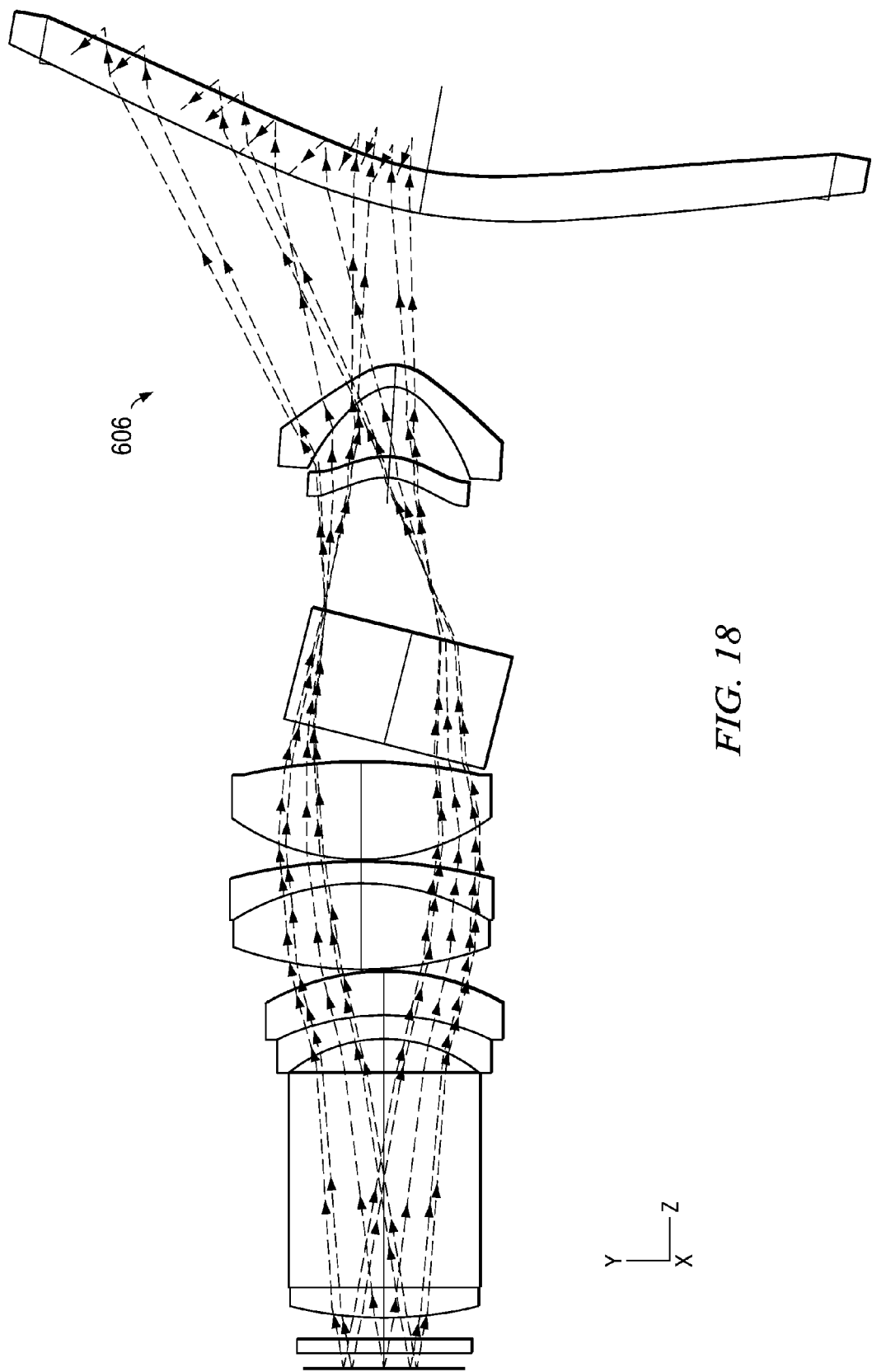
FIG. 18 is a schematic view of a projection lens through the XZ plane according to one embodiment of the present invention.
Figure 19:
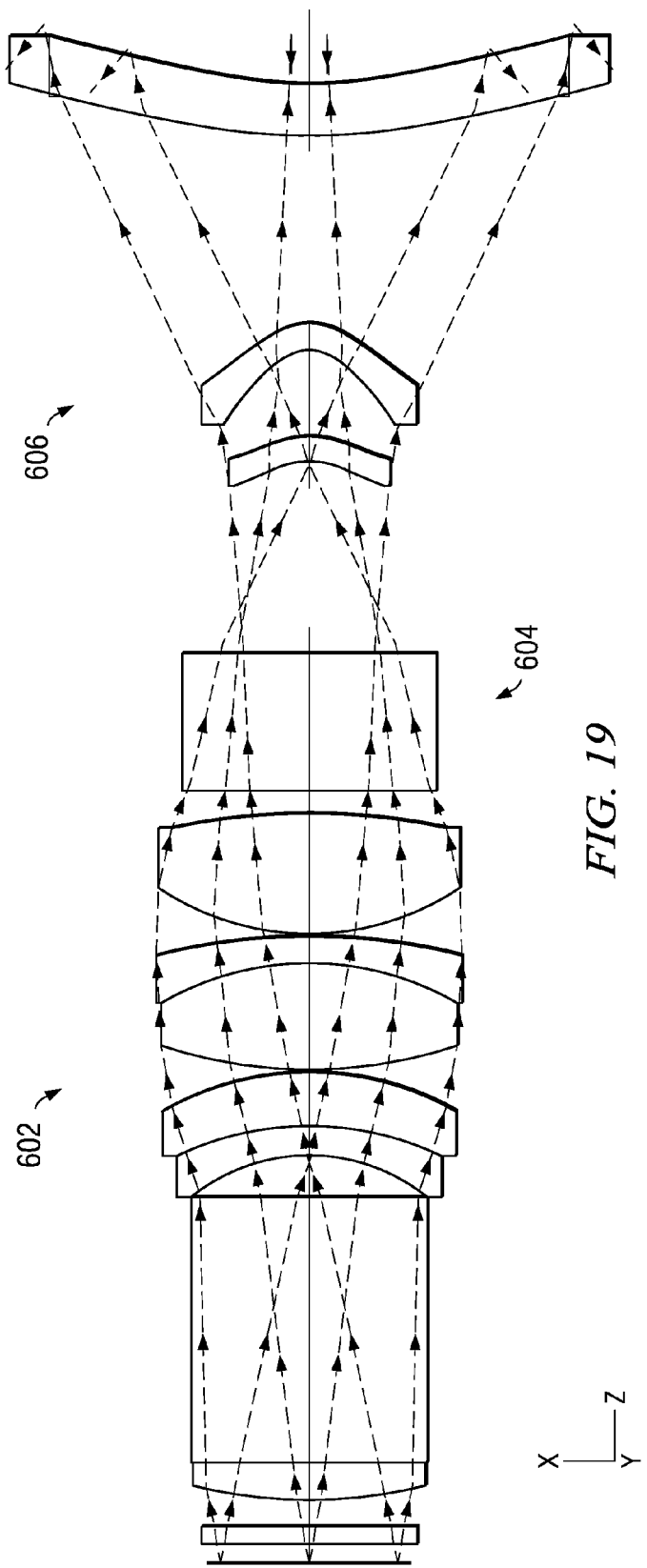
FIG. 19 is a schematic view of the projection lens of FIG. 18 through the XY plane.

FIGS. 14 through 19 illustrate lens groups 602, 604 and 606 for three embodiments of projection lenses according to the present invention. FIGS. 14, 16, and 18 illustrate views of the three embodiments in the x-z plane, while FIGS. 15, 17, and 19 illustrate views of the same three projection lenses in the x-y plane. Prescriptions for the optical elements of the three projection lenses are provided in Tables 1, 2, and 3 below in a format that is readily recognized by those of ordinary skill in the art of optical design.

TABLE 1

| SN | | Radius (mm) | th(mm) | Glass | ρ(mm) | Θx (deg) | Δy(mm) |
|---|---|---|---|---|---|---|---|
| 1 | Object | Infinity | 0.5 | Air | 7.67 | 0 | 0 |
| 2 | Window | Infinity | 0.65 | ZKN7 | 7.92 | 0 | 0 |
| 3 | | Infinity | 1.604 | AIR | 8.13 | 0 | 0 |
| 4 | FL | 26.346 | 1 | S-FPL51 | 9.20 | 0 | 0 |
| 5 | TIR | Infinity | 10.67 | SK4 | 9.32 | 0 | 0 |
| 6 | | Infinity | 1.393 | AIR | 11.72 | 0 | 0 |
| 7 | | −12.509 | 0.914 | FF8 | 11.69 | 0 | 0 |
| 8 | | 28.083 | 3.076 | S-FPL51 | 13.90 | 0 | 0 |
| 9 | | −17.722 | 0.1 | AIR | 14.52 | 0 | 0 |
| 10 | | 29.327 | 5.139 | S-FPL51 | 20.00 | 0 | 1.132 |
| 11 | | −21.334 | 0.1 | Air | 20.33 | 0 | 1.132 |
| 12 | | 14.579 | 9.67 | E48R | 20.21 | 0 | 1.132 |
| 13 | | −39.256 | 1.9 | Air | 17.25 | 0 | 1.132 |
| 14 | Wedge | Infinity | 11.52 | M-NBFD83 | 15.71 | 18.307 | 0 |
| 15 | | Infinity | 5.942 | TADF13 | 14.07 | 1.6951 | −1.911 |
| 16 | | Infinity | 1.5 | AIR | 14.85 | 18.7 | −2.8979 |
| 17 | | 10.7068 | 3.472 | E48R | 11.46 | 1.708 | −1.25 |
| 18 | | 7.9382 | 17.547 | AIR | 11.13 | 1.708 | −1.354 |
| 19 | | −4.5333 | 1.918 | E48R | 16.8 | 1.708 | −1.876 |
| 20 | | −7.5373 | 638.8 | AIR | 22.67 | 1.708 | −1.934 |
| 21 | Screen | Infinity | | | 888 | 0 | 0 |

| SN | k | α1 | α2 | α3 | α4 | α5 | α6 | α7 | α8 |
|---|---|---|---|---|---|---|---|---|---|
| 12 | −1.75 | 0 | 3.00E−05 | 1.55E−07 | 0.00E+00 | 0.00E+00 | 0.00E+00 | 0 | 0 |
| 13 | −13.054 | 0 | 4.96E−05 | 2.29E−07 | 0.00E+00 | 0.00E+00 | 0.00E+00 | 0 | 0 |
| 17 | 0.15675 | 0 | −1.41E−04 | −2.20E−06 | −4.58E−09 | 0.00E+00 | 0.00E+00 | 0 | 0 |
| 18 | −0.238 | 0 | −1.49E−04 | −3.09E−06 | −1.34E−08 | 0.00E+00 | 0.00E+00 | 0 | 0 |
| 19 | −0.8087 | 0 | 4.99E−04 | −1.35E−06 | −1.26E−08 | 0.00E+00 | 0.00E+00 | 0 | 0 |
| 20 | −0.7473 | 0 | 4.04E−04 | −2.17E−06 | 6.11E−09 | 0.00E+00 | 0.00E+00 | 0 | 0 |

TABLE 2

| SN | | Radius (mm) | th(mm) | Glass | ρ(mm) | Θx (deg) | Δy(mm) |
|---|---|---|---|---|---|---|---|
| 1 | Object | Infinity | 0.71 | Air | 3.80 | 0 | 0 |
| 2 | Window | Infinity | 0.65 | ZKN7 | 7.92 | 0 | 0 |
| 3 | | Infinity | 0.3 | AIR | 8.13 | 0 | 0 |
| 4 | | Infinity | 10 | BK7 | 4.20 | 0 | 0 |
| 5 | | Infinity | 0.6 | AIR | 5.53 | 0 | 0 |
| 6 | | 14.591 | 1.000 | FF8 | 6.37 | 0 | 0.566 |
| 7 | | 8.889 | 3.8 | S-LAL18 | 6.19 | 0 | 0.566 |
| 8 | | −17.518 | 0.1 | AIR | 6.18 | 0 | 0.566 |
| 9 | | 9.33 | 1.561 | S-FPL51 | 5.05 | 0 | 0.822 |
| 10 | | 18.787 | 2.6 | AIR | 4.70 | 0 | 0.822 |
| 11 | | −3.912 | 1 | Polystyr | 4.73 | 0 | 0.822 |
| 12 | | −27.443 | 3.833 | AIR | 4.71 | 0 | 0.822 |
| 13 | | 8.914 | 3.7 | E48R | 5.84 | 0 | 0.903 |
| 14 | | −10.441 | 0.8 | AIR | 5.84 | 0 | 0.903 |
| 15 | Wedge | Infinity | 6.976 | S-NPH2 | 4.76 | 22.48 | 0 |
| 16 | | Infinity | 5.28 | AIR | 4.76 | 22.48 | 0 |
| 17 | | −7 | 0.8 | E48R | 5.62 | 9.711 | −2.083 |
| 18 | | −28.157 | 760 | Air | 6.95 | 9.711 | −2.2185 |
| 19 | Screen | | | | 383 | 0 | 0 |

| SN | k | α1 | α2 | α3 | α4 | α5 | α6 | α7 | α8 |
|---|---|---|---|---|---|---|---|---|---|
| 11 | −2.425 | 0 | 2.35E−04 | −9.05E−06 | 0.00E+00 | 0.00E+00 | 0.00E+00 | 0 | 0 |
| 12 | −173.97 | 0 | 1.36E−03 | −1.39E−05 | 0.00E+00 | 0.00E+00 | 0.00E+00 | 0 | 0 |
| 13 | −5.659 | 0 | 9.62E−05 | −1.06E−06 | 0.00E+00 | 0.00E+00 | 0.00E+00 | 0 | 0 |
| 14 | 0.071 | 0 | 4.38E−05 | 9.36E−07 | 0.00E+00 | 0.00E+00 | 0.00E+00 | 0 | 0 |
| 17 | −1.155 | 0 | −5.56E−04 | −4.94E−06 | 1.05E−07 | 0.00E+00 | 0.00E+00 | 0 | 0 |
| 18 | −1.957 | 0 | −2.14E−04 | 3.37E−06 | −1.13E−08 | 0.00E+00 | 0.00E+00 | 0 | 0 |

TABLE 3

| SN | | Radius (mm) | th(mm) | Glass | □(mm) | □x (deg) | □y(mm) |
|---|---|---|---|---|---|---|---|
| 1 | Object | Infinity | 0.71 | Air | 3.80 | 0 | 0 |
| 2 | Window | Infinity | 0.65 | EAGLEXG | 3.94 | 0 | 0 |
| 3 | | Infinity | 1 | AIR | 4.03 | 0 | 0 |
| 4 | FL | 17.932 | 1.4 | S-YGH51 | 4.35 | 0 | 0 |
| 5 | TIR | Infinity | 10 | N-BK7 | 4.43 | 0 | 0 |
| 6 | | Infinity | 1.500 | AIR | 4.43 | 0 | 0 |
| 7 | | −7.007 | 1.1 | S-NPH1 | 4.40 | 0 | 0 |
| 8 | | −11.444 | 2 | S-FPL51 | 5.00 | 0 | 0 |
| 9 | | −11.059 | 0.1 | AIR | 5.50 | 0 | 0 |
| 10 | | 17.084 | 4 | S-FPL51 | 6.67 | 0 | 1.078 |
| 11 | | −11.035 | 1 | FF8 | 6.66 | 0 | 1.078 |
| 12 | | −23.071 | 0.1 | AIR | 6.87 | 0 | 1.078 |
| 13 | | 8.982 | 4.505 | E48R | 6.65 | 0 | 1.078 |
| 14 | | −20.547 | 0.837 | AIR | 6.30 | 0 | 1.078 |
| 15 | Wedge | Infinity | 5.301 | S-NPH2 | 5.12 | 14.004 | 0 |
| 16 | | Infinity | 7.417 | AIR | 5.12 | 14.004 | −1.2826 |
| 17 | | −2.766 | 0.942 | E48R | 3.85 | 4.055 | −2.013 |
| 18 | | −3.174 | 3.25 | AIR | 4.08 | 4.055 | −2.68 |
| 19 | | −1.463 | 1 | E48R | 3.95 | 4.055 | −4.98 |
| 20 | | −2.087 | 7.252 | AIR | 5.6 | 4.055 | −5.686 |
| 21 | | 22.886 | 1.957 | PMMA | 23.6 | 9.953 | −1.63 |
| 22 | Mangin | 14.73 | −1.957 | MIRROR | 24.4 | 9.953 | −1.97 |
| 23 | | 22.886 | −77.9 | PMMA | 25.7 | 9.953 | −1.63 |
| 24 | Screen | Infinity | | AIR | 208 | 12.199 | 0 |

| SN | k | □ | □ | □ | □ | □ | □ | □ | □ |
|---|---|---|---|---|---|---|---|---|---|
| 13 | −1.355 | 0 | 0.00E+00 | 0.00E+00 | 0.00E+00 | 0.00E+00 | 0.00E+00 | 0 | 0 |
| 14 | −14.007 | 0 | 0.00E+00 | 0.00E+00 | 0.00E+00 | 0.00E+00 | 0.00E+00 | 0 | 0 |
| 17 | −2.098 | 0 | 3.82E−03 | 5.82E−05 | −4.68E−06 | 0.00E+00 | 0.00E+00 | 0 | 0 |
| 18 | −1.8 | 0 | 4.73E−03 | −2.03E−05 | −7.06E−07 | 0.00E+00 | 0.00E+00 | 0 | 0 |
| 19 | −1.45 | 0 | −2.27E−03 | 1.26E−04 | −1.14E−05 | −2.75E−07 | 0.00E+00 | 0 | 0 |
| 20 | −0.897 | 0 | 1.10E−02 | −2.51E−01 | 3.08E−06 | 1.40E−08 | 0.00E+00 | 0 | 0 |
| 21 | −8.304 | 0 | 6.45E−06 | 1.40E−08 | −1.46E−11 | 4.47E−15 | 0.00E+00 | 0 | 0 |
| 22 | −12.659 | 0 | −5.52E−06 | 1.12E−08 | −1.24E−11 | 4.63E−15 | 0.00E+00 | 0 | 0 |
| 23 | −8.304 | 0 | 6.45E−06 | 1.40E−08 | −1.46E−11 | 4.47E−15 | 0.00E+00 | 0 | 0 |

Thus, although there has been disclosed to this point particular embodiments for methods and systems for creating images having a high image offset while maintaining a small form factor, a short throw, or both a small form factor and a short throw, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims and their equivalents.

What is claimed is:

1. A projection lens comprising:
   a display panel having an optical axis;
   a first lens group substantially collimating light from the display panel and introducing image offset in a first direction relative to the optical axis; and
   a second lens group focusing an image of the display panel on an image plane, wherein elements in the first lens group are offset relative to the optical axis by no more than 20% of a height of the display panel while the image has an image offset of 100% or more.

2. The projection lens of claim 1, wherein two or more lenses in the first group are decentered relative to each other.

3. The projection lens of claim 1, wherein all of the lenses in the first group are decentered relative to each other.

4. The projection lens of claim 1, operable to focus an object plane onto a parallel image plane.

5. The projection lens of claim 1, wherein the second lens group comprises a refractive optical shifter.

6. The projection lens of claim 1, wherein the second lens group comprises a reflective optical shifter.

7. The projection lens of claim 1, wherein the second lens group is tilted relative to the optical axis.

8. The projection lens of claim 1, wherein the second lens group is tilted relative to the optical axis about an aperture of the projection lens.

9. The projection lens of claim 1, wherein the elements in the first group are offset by no more than 15% of the height of the display panel.

10. The projection lens of claim 1, wherein the elements in the first group are offset by no more than 10% of the height of the display panel.

* * * * *